United States Patent [19]
Shanklin et al.

[11] Patent Number: 5,097,939
[45] Date of Patent: Mar. 24, 1992

[54] SYNCHRONOUS POSITION PRODUCT FEED SYSTEM

[75] Inventors: Frank G. Shanklin, Groton, Mass.; Robin G. Thurgood, Hampstead; Francis X. King, Jr., Nashua, both of N.H.

[73] Assignee: Shanklin Corporation, Ayer, Mass.

[21] Appl. No.: 711,326

[22] Filed: Jun. 6, 1991

Related U.S. Application Data

[63] Continuation-in-part of Ser. No. 431,532, Nov. 3, 1989, abandoned.

[51] Int. Cl.⁵ .............................. B65G 47/26
[52] U.S. Cl. .................. 198/419.2; 198/419.3; 198/460; 198/577
[58] Field of Search ............... 198/460, 572, 575–577, 198/620, 626.5, 419.2, 419.3

[56] References Cited

U.S. PATENT DOCUMENTS

| | | | |
|---|---|---|---|
| 3,075,630 | 1/1963 | Fisk | 198/460 |
| 3,081,863 | 3/1963 | Monohan | 198/460 |
| 3,237,365 | 3/1966 | Koulakoff et al. | 198/620 |
| 3,823,813 | 7/1974 | Holt | 198/620 |
| 3,944,049 | 3/1976 | Graybill | 198/460 |
| 4,197,935 | 4/1980 | Aterianus et al. | 198/460 |
| 4,360,098 | 11/1982 | Nordstrom | 198/460 |
| 4,394,896 | 7/1983 | McComas | 198/577 |
| 4,514,963 | 5/1985 | Bruno | 198/460 |
| 4,640,408 | 2/1987 | Eaves | 198/460 |
| 4,653,630 | 3/1987 | Bravin | 198/460 |
| 4,724,946 | 2/1988 | Cinotti | 198/460 |
| 4,852,717 | 8/1989 | Ross et al. | 198/460 |
| 5,038,915 | 8/1991 | Delsanto | 198/460 |

*Primary Examiner*—Joseph E. Valenza
*Attorney, Agent, or Firm*—Barlow & Barlow

[57] ABSTRACT

A controlled product feed system for delivering discrete products at high speed to a downstream industrial operation which requires accurate speed and position of delivery. A retarding force is applied to the product stream to accumulate an abutting sequence of products with means controlling the rate of package release to correspond to the downstream operation and timing the release to obtain a predetermined phase of arrival of products at the point of delivery.

11 Claims, 4 Drawing Sheets

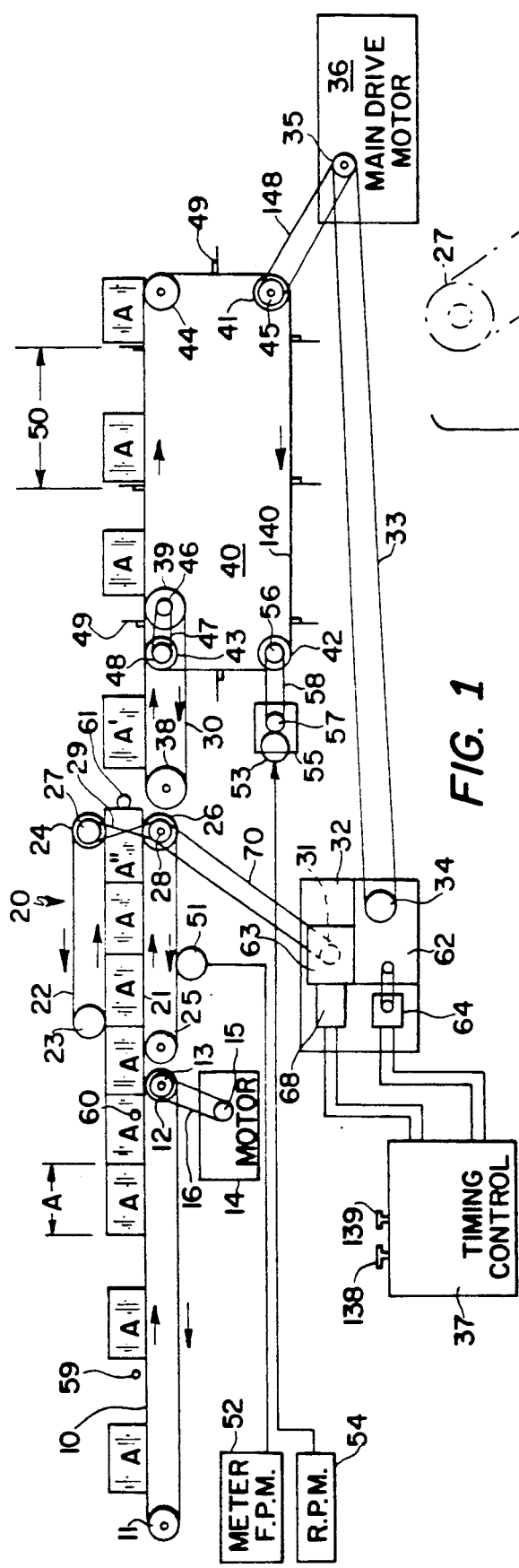
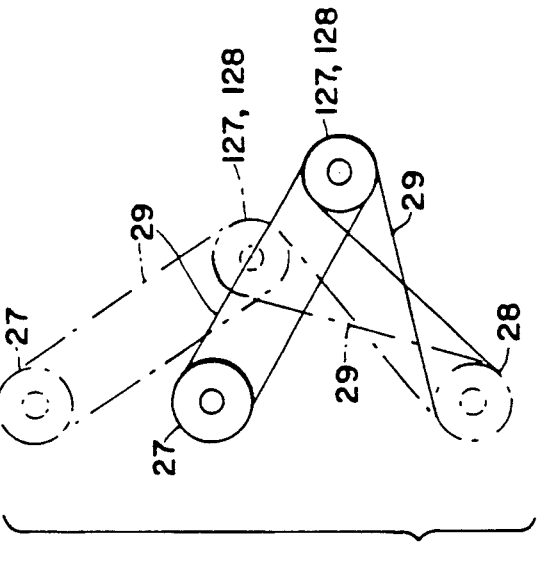
FIG. 1A
FIG. 1
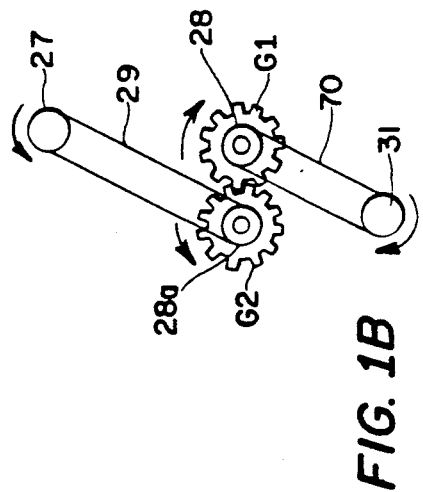
FIG. 1B

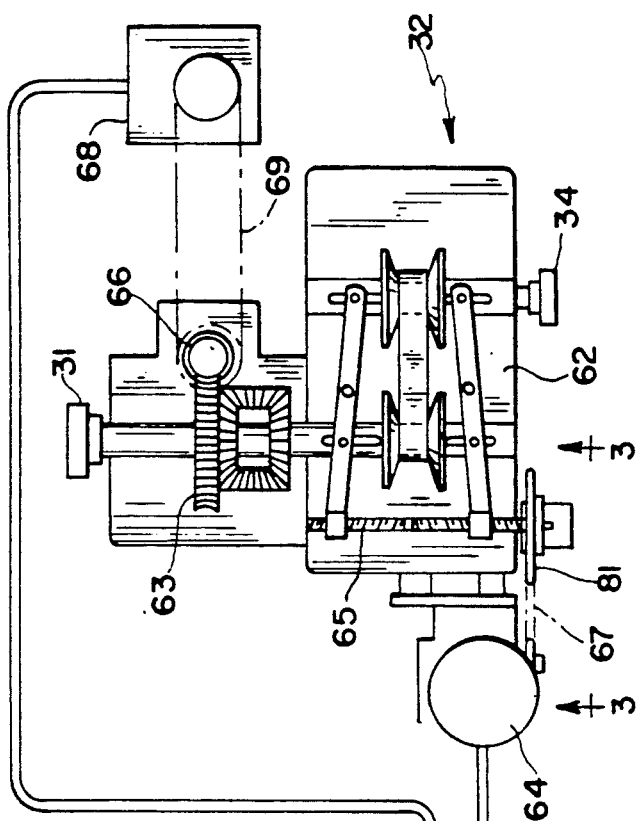
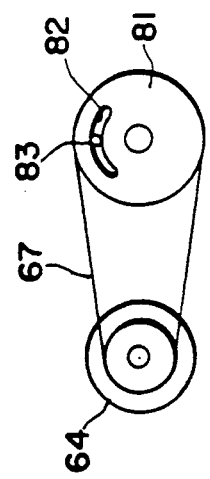
FIG. 3
FIG. 2

SYNCHRONOUS POSITION PRODUCT FEED SYSTEM

CROSS REFERENCE TO RELATED APPLICATION

This application is a continuation-in-part of our application Ser. No. 07/431,532 filed Nov. 3, 1989, now abandoned.

BACKGROUND OF THE INVENTION

The present invention relates to the sequential feeding of discrete items to processing machines. More particularly, the invention relates to internally synchronized discrete item feeding systems which provide accurate and efficient item registration and delivery at fast item delivery speeds.

Product feed systems are well known, and are in widespread use for the delivery of products in industrial processes. Such systems have been found to be particularly useful in conjunction with packaging machinery wherein discrete product units are delivered to machines which wrap, or otherwise process, the discrete product into a finished package for market. One form of this commercial operation involves a machine known as a horizontal-form-fill-seal machine. That machine includes an infeed conveyor which feeds products into the machine. The delivered product is then enwrapped in a tube of wrapping material that is formed by the wrapping machine, both ends and the bottom lap (or side joining of material) are sealed, and the tube of material with products within is severed between the end seals of succeeding packages to produce a series of discrete packages.

As the speed of delivery of products to the packaging machines is increased in an attempt to improve the efficiency of plant operations and reduce costs, it becomes necessary to utilize a continuous motion of the transverse sealing mechanism. These mechanisms are usually comprised of sealing jaws that rotate, or sealing jaws that travel in an orbital motion, or multiple sealing jaws fastened to a chain. In all cases the sealing jaws travel downstream at nearly the velocity of product flow during the time the transverse seal is being made. Higher packaging speeds require that the motion of the sealing jaws be essentially continuous to avoid the shock and vibration that would result from starting and stopping the jaws for each package.

Because the motion of the jaws is predetermined and continuous, it is necessary to control the location of the products entering the wrapping machine, and a flighted infeed conveyor is commonly used to control the position of products as they enter the seal jaws in a horizontal form-fill-seal machine. This is because the location of product passing through the wrapping machine must be such that the transverse jaws will make their end seals in the gaps between the products. As operational speeds become higher and product spacing becomes tightened, the location of the gaps (or spacing) between the discrete packages cannot be assured in the absence of a physical locating means such as that provided by the flights of the flighted conveyor. It should be noted, however, that even if the flighted conveyor were replaced with a flat belt conveyor, it would still be essential to control the placement of product on the belt in order to make seals in the gaps between the products. In this case, the synchronizing system of the present invention would serve the same function of locating the products into the machine as would the flighted conveyor were it present.

Feeding product between the flights of the flighted infeed conveyor has always been a problem. The simplest product feed system, of course, is manual placement of the individual product units on the conveyor. Even with multiple operators handling product to fill the flights on the conveyor, however, it is virtually impossible to keep up with a processing machine operating at well over 100 products per minute using the manual feed system.

Known mechanical feed systems for packaging machines include hopper feeds in which each flight of the conveyor strips a product off the bottom of a stack of products, and motorized hoppers which deposit product discretely into the respective spaces between the flights of the conveyor in response to signals generated by a cam or similar mechanism associated with the drive of the flighted conveyor. Such systems are limited in the types of packages which they can handle effectively. Thus, the hopper system is generally adaptable only to regularly shaped products of relatively low profile such as uniform size boxes or the like. Similarly, the motorized version is generally used to deliver thin product such as greeting cards, magazines, LP records and the like. Further, each of the hopper systems requires one product to slide alonq the surface of an adjacent product during the conveyor loading sequence which can cause jamming of the machinery and damage to sensitive products. Still further, manual or machine loading of the hopper is still required which introduces increased cost and reduced efficiency to the overall production operation.

Other mechanical means for sequentially loading the respective spaces between the flights of a flighted conveyor have been used. These means include angle feed in which product is fed at approximately a right angle to the flighted conveyor travel, brought to a dead stop and peeled off by the transverse action of the flights of the conveyor; the produce placement system in which the product is delivered in line against a stop which is periodically removed to permit the advance of a single product; and, timing screws which are adapted to feed product, usually of a particular shape which permits the entrance of the thread of the timing screws between adjacent product units, to the spaces between the flights of the conveyor sequentially. All of these systems have utility related to their particular mode of operation, but they all also suffer from disadvantages. In particular, the product placement system is limited to the delivery of product at speeds well below those that can be achieved with the present invention, and even at lower speeds, product motion involves violent starts and stops. Timing screws can be disadvantageous in that their use can be limited by product shape as described above, and in that a specific set of screws is required for each specific size and shape of product. The angle feed is limited to relatively narrow product, because the stop-start-stop action that occurs as each product is peeled off by the flighted conveyor and the next product is rapidly advanced into the path of the flights becomes more violent as product width increases.

Registration systems for continuously fed webs are well known but when individual discrete products are being handled, the situation is quite different because here control of any one product does not necessarily constitute control of preceding or succeeding products because each product is independent of all others. Furthermore, products may arrive at the infeed to the machine in an ever changing random spacing. It is also important to note that once a product is released from controlling members of the mechanism, it will travel at the speed of the conveyor upon which it is sitting and its timing cannot be further adjusted or corrected. Furthermore, since there is not connection between the products, each product must be individually controlled, properly spaced and sequenced to enter the space between the conveyor flights.

The Nordstrom patent, U.S. Pat. No. 4,360,098, discloses an infeed conveyor system for feeding packages to a wrapping machine and utilizes a squeeze conveyor that is driven through a differential; the squeeze conveyor running at a speed which is less than synchronous. When product falls behind a synchronous speed, the squeeze conveyor is driven at a speed higher than synchronous which causes the product to catch up and it continues to do so until a sensing mechanism determines that the product is too far advanced and the conveyor then resumes a speed which is slower than synchronous. The difficulty with this particular arrangement is that products are always moving in and out of correct location in the machine, and the product is never being fed at synchronous speed. A further problem is that when a product is sensed to be out of correct location, it is too late to bring it back into correct location. Succeeding products can be gradually brought back into correct location, but the position of the product that was sensed to be out of correct location cannot be corrected. The control conveyor of the apparatus of the present invention, on the other hand, always feeds product at synchronous speed, except for fractional second increases or decreases to bring product back into correct location. In addition, the present invention can correct the position of each product passing through it so that every product is delivered in correct location for subsequent processing.

SUMMARY OF THE INVENTION

The preferred embodiment and best mode for practicing the present invention are disclosed as an in-line product feed system for delivering a series of discrete, individual products precisely located into a processing machine usually between the flights of a flighted infeed conveyor. The product flow is smooth, involves no dead stops while feeding individual packages and, hence, is not subject to undue acceleration or deceleration which could cause product damage and undue wear upon the components of the system. The system of the invention is capable of delivering individual products to processing machinery at extremely high speeds, i.e., approaching 250 products per minute or more. To achieve these objectives, the present invention delivers product in-line to a dynamic retarding system which accumulates product in abutting contiguous position while maintaining forward motion of products. The dynamic retarding system is speed and phase controlled relative to a flighted conveyor (or other downstream destination) such that it thereafter delivers product one at a time in uniform sequential relation to a conveyor which deposits the discrete products individually precisely between flights of the flighted conveyor or other destination.

It is accordingly an object of the present invention to provide a product feeding system which is capable of handling a wide variety of products of various forms, shapes and content, and of delivering such products individually without undue acceleration, deceleration or physical stress to the products or the machinery and with accurate placement of the product on a subsequent conveyor or receptacle.

A further object of the present invention is to provide a product delivery system which accumulates randomly supplied product from a source and maintains a ready access storage which delivers product uniformly therefrom in synchronism with a time take-away such as a flighted conveyor.

An object is to provide a discrete product conveyor system which accepts products which have minor manufacturing size variations and eliminates the cumulative effect of such variations to deliver products to the output of the system in synchronism with a timed take-away conveyor.

A further object of the invention is to provide a product delivery system which is readily adaptable for the handling of discrete products of various shapes, sizes and contents.

A further object of the invention is to provide a product delivery system in which product size changes can be accommodated without the need for expensive change parts.

A further object is to provide a novel method of discrete product feed that produces precise position of the delivered product.

A further object of the invention is to provide a product delivery system capable of detecting whether any individual product is out of synchronism with a timed take-away conveyor and of correcting the position of that individual product incrementally to return it into synchronism prior to delivering the product to the take-away conveyor.

BRIEF DESCRIPTION OF THE DRAWINGS

These and other features and objects of the present invention will be apparent to those skilled in the art from the following detailed description of the preferred embodiments thereof and by reference to the attached drawings in which:

FIG. 1 is a schematic diagram of the transport and control system of a preferred embodiment of the invention;

FIG. 1A is a schematic representation of an articulated conveyor drive for height adjustment of an upper conveyor;

FIG. 1B is a schematic representation of a gear drive for the upper conveyor;

FIG. 2 is a pictorial diagram showing the control and differential drive portion of the system of FIG. 1;

FIG. 3 is a view on line 3—3 of FIG. 2 showing a slot and pin dead-zone drive;

DETAILED DESCRIPTION OF THE PREFERRED EMBODIMENT

Figure 4:
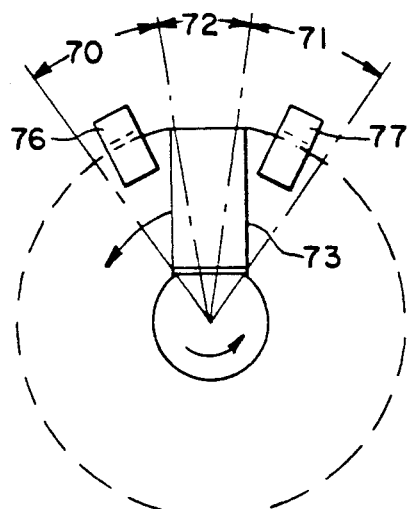
FIG. 4 is a diagrammatic view of a position phase sensor control suitable for use with the system of FIG. 1.

Referring now to the drawings wherein like elements are referred to by like reference numerals throughout, and particularly to FIG. 1, a diagrammatic representation of the arrangement of the conveyors and associated equipment of the present preferred embodiment of the present invention is shown. Generally, this arrangement comprises an infeed conveyor 10; a control conveyor 20, which includes a lower support belt 21 and an upper conveyor belt 22; a transfer conveyor 30; and, a flighted conveyor 40. The conveyors 10, 20, 30 and 40 are aligned for transferring the discrete products (designated "A") therethrough without significant change in the direction of product flow.

The infeed conveyor 10 is a flat, endless belt mounted upon rollers 11 and 12. Roller 12 includes a drive pulley 13. A drive motor 14, having a drive pulley 15, drives the infeed conveyor 10 at a preselected speed by drive belt 16 located about drive pulleys 13 and 15. The product support surface of infeed conveyor 10 is selected such that the discrete products A will slide thereon without damage in the event that they encounter an obstruction to their motion in the discretion of the travel of conveyor 10, indicated by arrows in FIG. 1. Conveyor 10 may be a belt conveyor whose belt has the proper coefficient of friction, or it could be a conveyor comprised of a series of rollers which deliver only limited thrust to products A.

The control conveyor 20 includes lower support belt 21 mounted upon rollers 25 and 26, and may also include an upper conveyor belt 22 mounted upon rollers 23 and 24. Suitable means, which will be described later, are provided so that the spacing between the lower run of upper conveyor 22 and the upper run of lower conveyor 21 may be varied according to the vertical dimension of the discrete product A to be processed by the system. Drive pulleys 27 and 28 on rollers 24 and 26 respectively, are connected by drive belt 29. It will be noted that, for simplicity, in FIG. 1 belt 29 is indicated as being crossed to reverse the direction of pulley 27 so that the lower portion of belt 22 will run in the same direction as belt 21. In a preferred embodiment, a spur gear drive, such as illustrated in FIG. 1B, produces the directional reversal by means of gears G1, G2 to provide the correct rotation of pulley 27 to drive conveyor 22 in the correct direction. The drive system between lower conveyor 21 and upper conveyor 22 is arranged to permit the vertical distance between conveyor 21 and conveyor 22 to be adjusted while maintaining a drive to the conveyor 22 as hereinafter described. A drive belt 70 connects drive pulley 28 to drive pulley 31 located on synchronizing transmission 32. Drive belt 33 connects drive pulley 34 on the synchronizing transmission 32 with a drive pulley 35 located on a main drive motor 36. The operation of synchronizing transmission 32, which is controlled by a timing control 37 will be described below in the context of the synchronizing operation of the present system. It will be seen, however, that through the above described system of drive pulleys and drive belts the conveyors 21 and 22 are driven at the same speed in the direction of the arrows shown in FIG. I.

As indicated in FIG. 1, the top run of drive belt 21 and the bottom run of drive belt 22 are spaced vertically at approximately the height dimension of the products A. As will be explained in detail, the spacing between the top and bottom runs of belts 21 and 22, respectively, is adjusted to just grip the packages A to retard them to the speed of conveyor 20. The speeds of conveyors 10 and 20 are set so that arriving products A are accumulated in end abutment with those products A which are still on conveyor 10 slipping on the upper run of conveyor belt 10.

The spacing adjustment between the upper run of conveyor 21 and the lower run of conveyor 22 can be accomplished by mounting conveyor 22 on any suitable mechanical means, such as guide rails, which will permit the height of conveyor 22 above conveyor 21 to be varied while maintaining the lower surface of conveyor 22 essentially horizontal and parallel to the upper surface of conveyor 21. A drive to conveyor 22 which adjusts to suit the height location of conveyor 22 can be accomplished by any suitable arrangement One such arrangement is indicated in FIG. 1A where the drive connection between drive pulley 28 and driven pulley 27 is by way of an articulated arm supporting idler pulleys 127, 128. As indicated by the alternate positions of idlers 127, 128 and driven pulley 27 in FIG. IA, the vertical spacing between drive pulley 28 and driven pulley 27 can be adjusted over any desired range of height for products A while maintaining a continuity of drive between belt 21 and belt 22.

Transfer conveyor 30 comprises a pair of belts mounted upon rollers 38 and 39 located on either side of flighted conveyor 40 which is mounted upon rollers 41, 42, 43 and 44. The flighted conveyor 40 is driven in the direction of the arrows shown in FIG. 1 by the main drive motor 36. This is accomplished by the engagement of a belt 148 with drive pulley 35 and a driven pulley 45, the latter being located on the roller 41.

Transfer conveyor 30 is driven by a belt 47 which is driven by drive pulley 48 mounted on roller 43 which in turn is driven by flighted conveyor belt 140. Belt 47 drives pulley 46 mounted on roller 39 and conveyor belts 30. The transfer conveyor 30 is driven at a speed sufficiently faster than control conveyor 20 to pull a gap between succeeding products A into which conveyor flights 49 can be inserted. The gaps also make it possible for sensing eye 61 to indicate precisely the leading and trailing edges of products A as they pass from control conveyor 20 to transfer conveyor 30. Although not illustrated, the transfer conveyor 30 may be driven by its own speed controlled motor separate from the main drive motor 36 without departing from the present invention.

In flighted conveyor 40 a plurality of flights 49 extend perpendicularly upwardly from the top outer surface defining gaps, representatively indicated at 50, between each pair thereof. The gaps 50 are larger than product length A and are contemplated to be established such that one discrete product A, or in the case of multiple product packages, a predetermined number of products will fit therein.

A transducer 51 is provided to sense the speed of control conveyor 20 and drives a meter 52 to provide a visual indication of that speed to the operator. Similarly, a meter 54 is driven by a transducer 53 on a rotary switch 55 to provide a visual indication of the speed of the flighted conveyor 40. The rotary switch 55 is driven by a belt 58 located around changeable sprockets 56 and 57 disposed on roller 42 and switch 55 respectively. The sprocket ratio can thereby be changed to match the spacing 50 between flights 49 as this spacing may be changed to accommodate different lengths of products A.

It will be understood that the object of the configuration of elements just described is to pass the discrete products A along the various conveyors in such a manner that they reach the flighted conveyor in phase to fall within one of the gaps 50 between the flights 49. To accomplish this objective, the products A must exit the control conveyor 20 to the transfer conveyor 30 at a rate such that a product is delivered for each gap between flights that occurs during the operation of flighted conveyor 40. In addition, the position (or timing) of discharge of each product A from control conveyor 20 must be such that transfer conveyor 30 will bring each product into the flighted conveyor so as to arrive in the gaps 50 between flights 49 rather than on top of a flight 49. This requires not only that the speeds of conveyors 20, 30 and 40 be maintained in the appropriate ratio, but also that the timing of product release from the control conveyor 20 and the passage of the flights 49 past the downstream end of the transfer conveyor 30 be synchronized in position as well as speed. With the present invention, it is possible to do this while continuously moving the products in essentially a straight line through the system. Although the velocity of the products is varied by the system, the forward motion of products is not stopped, and thus the products are not subjected to the violent acceleration associated with starting and stopping many times per minute as in prior art systems. As important as this is for products in the system, it becomes even more important when products A form a solid line of product upstream of the system. The forces generated by the momentum and inertia of a considerable accumulated weight of product being suddenly accelerated and then stopped in prior art systems can crush delicate product and can inflict considerable wear on machine parts.

In the present embodiment, an electric eye 61 in conjunction with the time control 37 and the synchronizing transmission 32 allow the foregoing objective to be realized. As best seen in FIG. 2, the synchronizing transmission 32 includes a variable speed drive mechanism 62 and a differential 63 between input drive pulley 34 and output pulley 31. The relative speed of output pulley 31 is controlled by adjustment screw 65 driven by an adjusting motor 64, by means of belt 67. The relative phase of output pulley 31 is controlled by the differential 63 whose position correction worm 66 is driven by the correction motor 68 by means of a belt 69 the operation of which is described in detail hereinafter.

There are numerous variable speed drive devices available in the art. The variable speed drive disclosed is commercially available and utilizes variable pitch pulleys to drive a metal chain in a bath of oil. It will be understood that by adjusting the pitch of the two pulleys by rotation of an adjustment screw 65, the output shaft velocity versus the input shaft velocity can be altered continuously. Accordingly, by adjusting the variable speed drive 62, the speed of the control conveyor 20 can be modified relative to the speeds of the transfer conveyor 30 and flighted conveyor 40. In each case, it is contemplated that the speed of the control conveyor 20 will be less than the speed of the infeed conveyor 10 for reasons which will become apparent presently.

At the outset, the speed ratios of the various conveyors are set manually utilizing meters 52 and 54. It will be seen that the meter 52 reads out the number of feet per minute (or other convenient format of velocity) at which the control conveyor 20 is traveling. The meter 54, o the other hand, reads out the revolutions per minute (or equivalent) at which the rotary switch 55 is being driven by the belt 58 as sensed by transducer 53. By appropriately selecting he size of the sprockets 56 and 57, the rotary switch 55 can be made to pass through one rotation for each flight space 50 of the flighted conveyor 40. The relative speed of the control conveyor 20 and the flighted conveyor 40 can be adjusted manually by adjusting the variable speed drive 62. Conveniently, this adjustment may be made by activation of advance or retard push buttons on a time control 37 to activate the adjusting motor 64 which controls the desired adjustment of the variable speed control 62.

The general operation of the mechanical elements of the disclosed embodiment will now be described.

The discrete products A are fed into the machine on infeed conveyor 10 driven by motor 14. As mentioned previously, the infeed conveyor 10 is running at a faster speed than the control conveyor 20. Thus, as the packages A reach the control conveyor 20, they are grasped between the upper belt 22 and the lower belt 21, and are slowed from their velocity on the infeed conveyor 10. Since the operation of the device is continuous, this leads to a back up of abutting products A on the infeed conveyor 10. Damage to the product and/or the machinery due to this back-up of product is not a problem because the infeed conveyor 10 is specifically designed to permit the slippage of product thereon upon its encountering a force resistive to the forward movement of the product. An electric eye 60, located adjacent the downstream end of the infeed conveyor 10, and an electric eye 59, located upstream from eye 60, control the operation of the remainder of the conveyors and permit the utilization of at least two modes of operation.

In one of these modes, the eye 60 controls the operation of the main drive 36 such that the main drive 36 and control conveyor 20 are maintained in the off condition until product is located in front of the eyes 60 and 59. Once sufficient product has accumulated on the infeed conveyor 10, to block eye 60 and eye 59, the main drive 36 will be activated and the product feed function of the equipment will proceed. Eye 59 is used to determine when the requisite accumulation of product has occurred. Thus, eye 59 also includes a time delay circuit which allows spaced individual products to pass it without activation of the main drive 36. Eye 60 may be used alone, but it is preferred that eyes 59 and 60 be used in combination in order to assure a sufficiently long run and to avoid short term stops and starts which may be injurious to the wrapping machine to which products A are delivered. The absence of product in front of the eye 60 will cause the main drive motor 36 to be turned off.

Alternatively, a two speed main drive may also be used. Such a drive mechanism is more self correcting and less prone to shut down the system during normal operating conditions. In this case, when product is absent from in front of the eye 60 the machine stops. Product is thereafter allowed to accumulate back on the infeed conveyor 10 until the eye 60 an subsequently eye 59 are again covered. At this point, the main drive is started in the low speed mode until a continuous flow of product covering eye 59 causes a time delayed circuit to close thereby switching the main drive into the high speed mode. When there is insufficient product on conveyor 10 to keep eye 59 covered, the main drive shifts into low speed mode until eye 59 is again covered and the main drive will again shift into high speed. If eye 60 is uncovered, the main drive will stop. The control of the high and low speed operation of a drive motor is well known in the art and may be accomplished in numerous ways.

Figure 5:
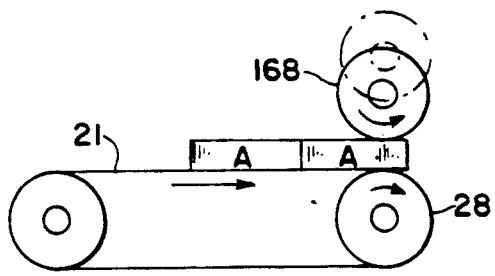
FIG. 5 is a diagrammatic side view of an alternative dynamic retarding means suitable for use with the present invention.
Figure 6:
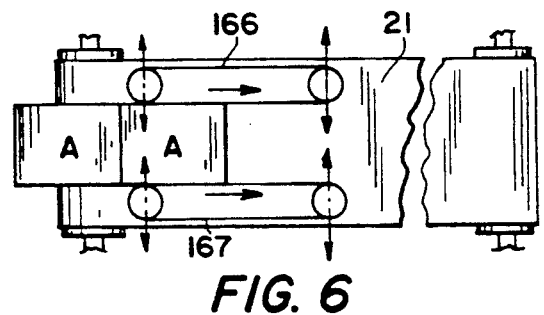
FIG. 6 is a diagrammatic top view of another dynamic retarding means suitable for use with the present invention.

Once the products A have accumulated upon infeed conveyor 10 to a predetermined back-up at eye 59, the remainder of the conveyors are activated. The control conveyor 20 grips each product and transfers it to the transfer conveyor 30. As previously described the control conveyor 20 may be an upper and a lower conveyor as discussed above. In this event, the upper conveyor 22 may be supplied with an articulating chain drive as described with reference to FIG. 1A (or other appropriate mechanism) which permits the adjustment of the spacing between the upper and lower conveyors so that products of varying heights may be accommodated by the system. Alternatively, the control conveyor may be a lower conveyor and an upper roller 168 used to create a pinch roller assembly with roller 28 adjacent the downstream end of the control conveyor 20 as shown in FIG. 5. The control conveyor 20 may also comprise a lower conveyor 21 and a pair of side squeeze conveyors (or rollers) having adjustable width spacing generally indicated at 166 and 167 in FIG. 6. The choice regarding which type of control conveyor is to be used will depend upon the nature of the packages to be controlled.

Whatever the configuration selected for the control conveyor 20, it is important that it satisfy several criteria. Thus, the control conveyor must overcome the forward force imparted to the products by the infeed conveyor 10 such that the speed of the products on the control conveyor 20 is determined totally by that conveyor, and not externally thereto. As will be seen presently, if this condition is not met, the entire synchronization of the system may be destroyed. In addition, it is important that the control conveyor 20 maintains control of the products until their trailing edges are released therefrom. This is a subtle, but a very important feature of this invention. The speed of transfer conveyor 30 is faster than the speed of the control conveyor 20 so that a space will be created between the products deposited thereon by the control conveyor 20. This allows the discrete products to be deposited within the spaces 50 between the flights 49 and provides space between succeeding products into which flight 49 can be inserted. The change of velocity of the products from the control conveyor 20 to the transfer conveyor 30 occurs effectively upon release of product from the control conveyor 20 and the point at which the velocity change occurs must be the same for every product for the system to work reliably. Accordingly, as the products pass the downstream end of the control conveyor 20, it is important that their weight be substantially transferred to the transfer conveyor 30 prior to their release by the control conveyor 20. One cannot rely simply upon the differential speeds of the control and the transfer conveyors because the center of gravity of the products may vary significantly. This would mean that some products would become controlled by the transfer conveyor 30 earlier than others. Even products with a uniform center of gravity will show variation in transferring from a lower speed belt to a higher speed belt if gravity and friction are the sole determinates of which belt velocity the product will assume. Failure to provide the positive control of product transfer would clearly destroy any possibility of reliably synchronizing the system as will be described presently. Transfer conveyor 30 will therefore be provided with a conveying surface that permits slippage of the product therealong after its weight has been transferred to it but before its rear edge is released by the control conveyor 20. In certain applications it may be possible to replace the transfer conveyor 30 with a gravity chute, an air blast on the products, or some other means of accelerating products out of control conveyor 20 creating product separation, but this does not alter the requirement for a precision release from control conveyor 20. Such alternate product take-away would still be within the scope of this invention.

After the released product is transferred to the transfer conveyor 30, it is deposited on the flighted conveyor 40 for final delivery to a subsequent destination or processing machine. The speed ratio of the control conveyor 20 to the flighted conveyor 40 is set such that the rate of product delivery by the control conveyor 20 will correspond with the rate of passage of spaces 50 of the flighted conveyor past the downstream end of transfer conveyor 30.

Referring to FIG. 1, and the following description, the mathematical relationship between the speeds of conveyor 20 and 40 will become evident. It will be noted that infeed conveyor 10 delivers a sequence of products in a fashion where the product may slip if forward advance of the product A, for example, is resisted by an accumulation of product. Control conveyor 20 essentially accumulates products from infeed conveyor 10 in a contiguously abutted condition as seen in FIG. 1. In order to deliver one product A per space 50 of the flighted conveyor, control conveyor 20 must run at a speed that is equal to the speed of the flighted conveyor 40, multiplied by the length of a product A, and divided by the length of a designated space in the product receiving means as indicated at 50. For delivering multiples of product A, control conveyor 20 must, of course, run at multiples of the speed described above. The transfer conveyor 30 removes the product at a speed higher than the speed of the control conveyor 20 so as to create a space between succeeding products. The speed differential between the conveyors together with a means, which will be described presently, of synchronizing the release of products A with the position of spaces 50 allows one to insure that the products A will be deposited into the spaces 50, rather than on top of a flight 49. In applications of the invention which a flighted conveyor is not used, the need would still exist to deposit products onto a conveyor synchronized with the machine components, such as transverse sealing jaws, so that the seals will be made in the gap between the products. Thus the synchronizing system would serve the same function as with the flighted conveyor of feeding products precisely into the wrapping machine.

Product synchronization is accomplished utilizing timing control 37, differential 63, gear motor 68, rotary switch 55 and the electric eye 61 shown in Figs. 1 and 2 in the following manner.

As products pass from control conveyor 20 to transfer conveyor 30, the higher speed of transfer conveyor 30 pulls a gap between the products released to the transfer conveyor 30. This gap permits electric eye 61 to sense the end of each product and thus the position of the product as it reaches the discharge end of control conveyor 20. Electric eye 61 signals this position to timing control 37. The timing control 37 then compares the position of the product with the position of the flighted conveyor 40 by means of a signal from rotary switch 55, which it will be recalled is being driven by the flighted conveyor 40 at a speed such that one revolution of the switch indicates the advancement of the flights of the flighted conveyor a distance equivalent of one space 50. In some cases the advancement of one space 50 could rotate switch 55 two or more complete revolutions, but its signals must always accurately represent the location of the conveyor flights for each product released. Also, for short packages, switch 55 could rotate one complete revolution for every two, three or more complete spaces 50 of travel of conveyor flights 49 without changing the intent of the invention.

As illustrated in FIG. 4, the rotary switch 55 is constructed so that there is an advance sector 70, a retard sector 71, and a zero section 72. These sectors are defined by the position of sensors 76 and 77 which sense the passage of an armature 73 which generates the signal of rotary switch 55 as calling for a zero, advance or retard correction. The peripheral positions of sensors 76, 77 are adjustable to vary the size of the zero sector 72. The timing of rotary switch 55 (See FIG. 2) relative to flighted conveyor 40 can be adjusted by loosening a locking screw 155 and rotating a sensor mounting plate 156 relative to the armature 7 and thereafter tightening the locking screw 155.

If the signal from the eye 61 occurs when the armature 73 of the switch 55 is in the zero sector 72, as shown in FIG. 4, it signals that product placement is correct, and therefore no correction (zero correction) occurs at either adjusting motor 64 or correcting motor 68. If signal from eye 61 occurs when the armature 73 is in the area of sensor 77, as shown in Fib. 4B, it signals that a retard connection is required. A corresponding signal is sent to gear motor 68 to drive the differential 63 in such a direction as to retard the position of control conveyor 20, thereby delaying the release of the next product therefrom. The amount by which the control conveyor 20 is retarded is adjusted by adjusting the time interval of operation of gear motor 68 by means of an interval timer, many types of which are commonly known in the art.

The time set into the interval timer is generally one to two tenths of a second, and full positional correction should be accomplished with the passage of a single product if every product being delivered is to be in correct location with respect to spaces 50. Thus at production rates of 120 products per minute, the maximum desirable running time for gear motor 68 would be five tenths of a second. Thus it will be seen that positional corrections are accomplished by means of short incremental adjustments to the position of control conveyor 20 with respect to the position of flighted conveyor 40.

Figure 4A:
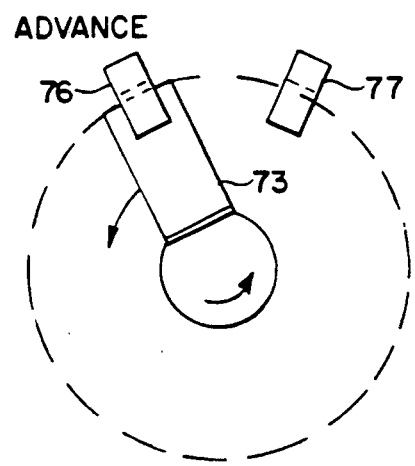
FIG. 4A is a diagrammatic view of the device in FIG. 4 with the armature in the advance sensor.
Figure 4B:
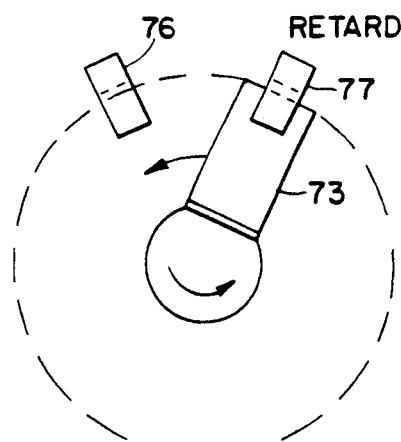
FIG. 4B is a diagrammatic view of the device in FIG. 4 with the armature in the retard sensor.

In the event that the armature 73 is in the area of sensor 76, as shown in FIG. 4A when the signal from eye 61 occurs, this signals that an advance correction is required. A corresponding signal advances the control conveyor 20 by driving differential 63 in a direction to advance the position of control conveyor 20 in a similar manner as just described for retardation. Sensors 76 and 77 send advance and retard signals respectively to control 37 when armature 73 is present at the respective sensors in incremental steps by conveniently using timers in the circuit to motor 68.

Figure 4C:
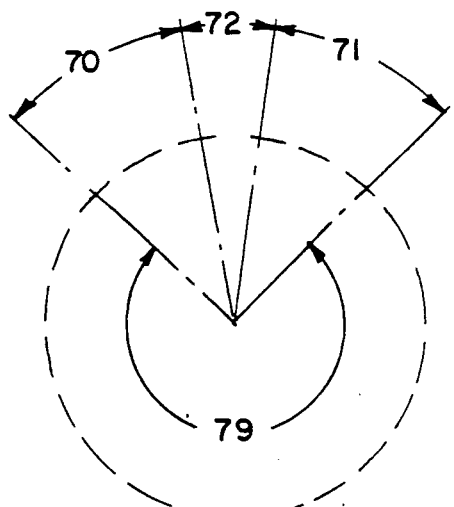
FIG. 4C is a schematic diagram of FIG. 4 showing advance, retard, zero, and dead-band sectors.

FIG. 4C illustrates that in addition to the advance, zero, and retard sectors of the rotary switch 55 there is a dead-band 79 in which no sensing is made and no correction will occur. Because of this, it is essential to start up the system in such a way that the signal from eye 61 will occur when the armature 73 is within the advance, zero, or retard sections. Referring to FIG. 1, the first product A' downstream of control conveyor 20 is advanced to a predetermined point on transfer conveyor 30 and the next A" to exit the control conveyor 20 is advanced until it covers eye 61. Control conveyor 20 is then retarded until product A" just uncovers eye 61. This represents the zero position for the product. Control conveyor 20 can conveniently be advanced or retarded by operating a position adjust advance jog switch 138 or retard jog switch 139 to cause correcting motor 68 to respectively advance or retard the control conveyor. Locking knob 155 is loosened and rotary switch 55 is then adjusted until a slight adjustment of the switch is either direction will cause either the green advance LED (115 on FIG. 2) or red retard LED (116 on FIG. 2) to illuminate. The rotary switch 55 is then locked in the zero sector 72 which is indicated when neither LED 115 nor LED 116 are illuminated. The rotary switch 55 is now correctly aligned and should be locked in position by tightening locking knob 155

While the relative speed of control conveyor 20 to flighted conveyor 40 is initially set manually, it is advantageous to have these relative speed corrections under automatic control. One reason for this is that the product lengths may vary slightly over the course of a run. Since lengths are cumulative, any variations in product length could cause the position correcting gear motor 68 and differential drive 63 to correct the location of every product in an attempt to maintain proper synchronization. Additionally automatic speed adjustment makes it easier for a moderately trained operator to set up the control conveyor correctly, because once it is set reasonably closely, the system will take over and make the final adjustment automatically. Excessive running of gear motor 68 and differential drive 63 may be avoided by energizing the length adjusting motor 64 at the same time as the gear motor 68, so that while the correction in placement is being made with the differential 63 a very minute adjustment is also being made to the variable speed drive 62 by energizing motor 64.

FIG. 3 shows an arrangement to prevent excessive wear on the speed adjustment parts of the variable speed drive 62. A sprocket 81 having an arc slot 82 which can drive a pin 83 is utilized between the adjusting motor 64 and the variable speed drive adjusting screw 65. Motor 64 drives the sprocket 81 with slot 82 via belt 67 as shown. Variator speed adjustment screw 65 incorporates pin 83 attached to it. Except for engagement of pin 83 in either end of slot 82, sprocket 81 can turn freely with respect to adjusting screw member 65. In this way, minute motions back and forth of the sprocket 81 moves slot 82 but will not move pin 83 and thus will not cause the adjustment screw 65 of the variable speed drive 62 to move. But greater motion in one direction will cause the pin 83 to engage the sprocket at one end of slot 82 and adjust the variable speed drive mechanism to correct the speed of the variator. A similar function could be accomplished electrically, if desired.

The timing control 37 contains the circuitry to compare the output from the eye 61 with the signal received from the rotary switch 55. It also contains manual jog adjustments 138 and 139 for the gear motor 68 and adjusting motor 64, lights to indicate the phase of the machine and the institution of the various corrective measures described above to the operator, and visual indications of its other various timing and control functions such as, "Control On" and "Control Off".

Figure 7:
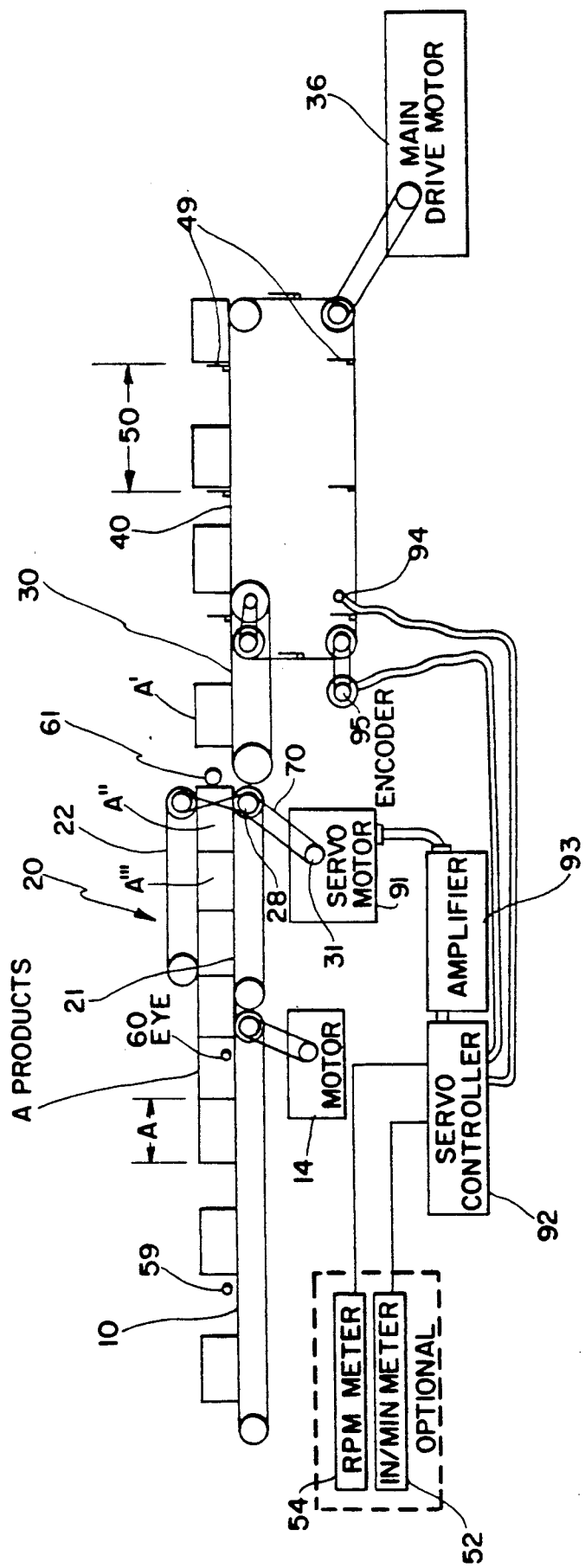
FIG. 7 shows an alternative means for driving and controlling the preferred embodiment incorporating a servo-motor, drive and control system.

FIG. 7 shows an alternative means for driving and controlling the preferred embodiment of the invention incorporating a servo motor, drive, and control system. FIG. 7, in which like parts bear like reference numerals to FIG. 1, incorporates the same infeed conveyor 10 feeding products A into a control conveyor 20 which retards the speed of the products, accumulating them on the infeed conveyor. Control conveyor 20 feeds contiguously abutted products A past eye 61 onto transfer conveyor 30 and into spaces 50 between flights 49 on flighted conveyor 40. Infeed conveyor 10 is driven by gear motor 14 and run at a higher speed than control conveyor 20. Flighted conveyor 40 is driven by main drive motor 36, which in turn drives transfer conveyor 30, through belt and pulley system 46, 47 and 48. In this embodiment of the invention, servo motor 91 drives the control conveyor 20 by means of belt 70 and pulleys 28 and 31. Signals to control the speed and position of the servo motor are generated by servo controller 92 and corresponding current is supplied to drive motor 91 by servo amplifier 93. The position of the flights in flighted conveyor 40 are sensed by flight sensor 94 each time a flight passes the sensor. Meter 54 indicates the speed of flighted conveyor 40 and meter 52 indicates the speed of control conveyor 20. In this embodiment these meters are optional, since they are not necessary for ease of set-up of the machine.

In operation, packages A are accumulated at the control conveyor 20 and are separated by transfer conveyor 30 which runs faster than control conveyor 20. Eye 61 senses the leading edge of product A" as it advances into the eye, and the computer in the servo controller measures how far the control conveyor is driven before the leading edge of the succeeding product A', is sensed by eye 61. Thus the servo controller, which incorporates a computer, learns the length of products A. Encoder 95 signals to the servo controller the position and motion of flighted conveyor 40 while the flight sensor 94 signals the servo controller as to the position of each flight as it passes. Thus the computer learns how far encoder 95 is rotated for the passage of one space 50 of the flighted conveyor, and it also learns the exact location of the last flight 49 that was sensed. Since the speed ratio between flighted conveyor 40 and transfer conveyor 30 is known (it can be calculated from the diameters of the sprockets and pulleys involved), the computer in the servo controller can be programmed so that it will call for releasing products A from the control conveyor at the right point so that they will be inserted between flights 49 of the flighted conveyor 40. Once the servo controller computer has been taught the flight spacing and the flight location, and it has been taught the product length as described above, the machine is ready to run.

In operation, the control conveyor 20 is driven at the precise speed to feed one product for every flight 49 of the flighted conveyor 40. Thus, servo motor 91 will drive the control conveyor at a speed equal to the speed of flighted conveyor 40 multiplied by the length of a product A and divided by the length of a space 50. For delivering multiples of product A, control conveyor 20 must, of course, run at a multiple of the speed described above providing that the servo controller 92 has been programmed to feed multiple products into the flight spaces.

As previously described, it is important that product A be inserted into the spaces between the flights and not on top of a flight 49. Thus, every time a flight 49 passes flight sensor 94, it will signal the position of the flight to the servo controller 92. Since the position of each flight 49 is indicated by flight sensor 94, and since the speed of travel of the belt 140 of flighted conveyor 40 is being continuously monitored by means of encoder 95, and since the positional relationship of conveyors 20 and 40 are known and the speed relationship of conveyors 30 and 40 are known, servo controller 92 will compute when to release product A" so that it will be in proper synchronization for deposit in a space 50 between conveyor flights 49. When eye 61 sees the leading edge of product A", it signals the servo controller which compares the position of product A" with what it knows to be the correct position for proper release of the product. If the product has arrived at eye 61 at the proper time, no change is made and the servo motor continues to run without correction. In the event that the product arrives in advance of the correct position, the servo controller 92 calculates the proper correction, superimposes the correction on the running signal, and sends the combined signal to amplifier 93 which in turn sends the correct current to servo motor 91 to retard the product sufficiently so that the product will release at the proper time to synchronize into a space between flights 49. Similarly, if product A" arrives too late at eye 61, the servo controller 92 will calculate the amount to advance the product, and will signal amplifier 93 which will send modified current to servo motor 91 so that product A" is advanced to arrive between flights 49 of flighted conveyor 40. After each correction, the servo motor returns to its previously set running speed. The positional correction made by the servo motor should be accomplished prior to the trailing end of each product A being released from the control conveyor, so that every product delivered to flighted conveyor 40 will be synchronized into the correct position in spaces 50 of flighted conveyor 40.

Servo controller 92 can be programmed so that the running speed will be adjusted automatically in the event that positional corrections occur predominantly in the same direction. Alternatively, servo controller 92 can be programmed to automatically adjust the speed of control conveyor 20 for products A on a continuing basis, since encoder 95 is continually measuring the speed of flighted conveyor 40, and since eye 61 is continually indicating the length of products A as they pass by the eye. The positional correction made by the servo motor should be accomplished prior to the trailing end of each product A being released from the control conveyor, so that every product delivered to flighted conveyor 40 will be synchronized into the correct position in spaces 50 of flighted conveyor 40. Having thus described preferred embodiments of the present invention, numerous modifications, variations, additions and equivalents will occur to those skilled in the art. Accordingly, the invention is not limited to the specific disclosed embodiments, but only by the scope of the appended claims.

We claim:

1. An in-line product feed system comprising:
   a first in-line conveyor for transporting a sequence of discrete products at a first linear speed but adapted to allow product to slip if forward advance of product is resisted;
   a second in-line conveyor for receiving product discharged from said first conveyor and running at a speed slower than said first conveyor;
   product retarding means located at said second conveyor arranged to control product thereon to advance at the running speed of said second conveyor thereby accumulating products from said first conveyor in a contiguously abutted condition;
   product removal means for removing said product discharged from said second conveyor at a speed higher than the speed of said second conveyor thereby creating a space between succeeding products;
   product receiving means with designated spaces for individually receiving and removing spaced products from said product removal means;
   means to adjust the speed of said second conveyor whereby the speed of said second conveyor is equal to the speed of said product receiving means multiplied by the length of said product or a grouping of said product being fed and divided by the length of a designated space in said product receiving means;
   means for generating a first signal timed in relation to the designated spaces of said product receiving means; and
   control means including, means for sensing the discharge of individual product near the discharge end of said second conveyor to produce a second control signal,
   means for comparing the first and second signals to determine which of said products require positional corrections; and
   means for incrementally advancing or retarding the time of discharge of said products from said second conveyor in response to signals from said comparing means to deliver products in fixed relation to the individual receiving positions of said product receiving means.

2. Apparatus according to claim 1 in which said means for sensing discharge of individual product at said second conveyor senses the position of product being controlled by said second conveyor thereby permitting each one of said products to be advanced or retarded if positional correction is required prior to its being discharged to said product removal means.

3. The method of discrete product feed while maintaining continuous downstream motion of the products to a continuously moving conveyor receiving products for subsequent processing which requires a uniform and predetermined placement of products comprising the steps of:
   supplying products at the desired rate of product processing;
   accumulating contiguously abutted products from the source supplying said products;
   controlling rate of delivery of individual products from said accumulation of products such that one product is delivered for the passage of each designated space on said receiving conveyor;
   the controller delivery of individual products operating solely by application of retarding force to supplied products to cause the contiguously abutted accumulation of products and maintaining the retarding force on the leading product in said abutted products until the synchronized time of release;
   continously sensing position of products, the length of said products, the distance between products in the required predetermined placement and automatically adjusting the speed of said products to synchronize the timing of release of individual products such that said products arrive for said subsequent processing in a fixed relation as required for said predetermined placement; and
   transporting the released products away from the point of release with the required predetermined placement in the product stream.

4. An in-line product feed system for feeding individual products to a product receiving means which has a requirement for a predetermined spacing of products comprising:
   an in-line product supply means for supplying a sequence of discrete products;
   an in-line transport having a dynamic retarding means for receiving products from said in-line product supply means and accumulating an abutting contiguous line of said discrete products in which the speed of said dynamic retarding means is adjusted incrementally to that required to deliver one discrete product per predetermined spacing of said product receiving means, said speed of said dynamic retarding means being such that the speed of said dynamic retarding means is equal to the speed of said product receiving means multiplied by the length of said product being fed and divided by the length of one said predetermined spacing of said product receiving means;
   discharge control means associated with said dynamic retarding means operable to open a space between succeeding products and to transport products to said product receiving means;
   said product receiving means arranged to receive product from said discharge control means.

5. An in-line product feed system as in claim 4 in which the dynamic retarding means comprises a conveyor for product received from said in-line product supply means and a rotating contact means adjustably spaced from said conveyor to form a nip sized to contact said product and control advance of said product at the speed of said conveyor, said nip controlling the discharge of product until the trailing edge of said product passes out of said nip.

6. An apparatus according to claims 4 or 5 and including means for sensing position of product exiting from said dynamic control means;
   means for sensing said predetermined spacing requirement of said product receiving means;
   and means operable for controlling said dynamic retarding means to incrementally advance or retard the phase position of any products requiring positional correction prior to discharge of said discrete products from said dynamic retarding means in order to position said products such that product will be delivered within said predetermined spacing requirement of said product receiving means.

7. An in-line product feed system for feeding products into a packaging machine which has a requirement for a specific spacing of products while maintaining a continuous downstream motion of products through the system comprising:

a first in-line conveyor for transporting a sequence of discrete products at a first linear speed but adapted to allow products to slip if forward advance of product is resisted;

a second conveyor in-line with said first conveyor for receiving products discharged from said first conveyor and running at a speed slower than said first conveyor;

dynamic retarding means at the discharge end of said second conveyor arranged to control products thereon to advance at the running speed of said second conveyor;

means to remove said products discharged from said retarding means at a speed higher than the speed of said second conveyor thereby creating a space between said products;

means for receiving and removing product said spaced products from said product feed system; and to adjust the speed of said second conveyor whereby the speed of said second conveyor is equal to the speed of said product receiving means multiplied by the length of said product or a grouping of said product being fed and divided by the length of said specific spacing of said products in said product receiving means.

8. Apparatus according to claim 7 wherein said dynamic retarding means comprises a conveyor for products received from said first in-line conveyor and a rotating contact means adjustably located to form a nip sized to contact and grip said products and control advance of said products at the speed of said contact means.

9. Apparatus according to claim 8 wherein said nip is formed between said second conveyor and said rotary contact means to control discharge of products until the trailing edge of each said product passes out of said nip.

10. An in-line product feed system for feeding individual products to a product receiving means which requires a predetermined spacing and placement of products comprising:

an in-line product supply means for supplying a sequence of discrete products at a speed greater than that required by said product receiving means;

an in-line transport having a dynamic retarding means for receiving products from said in-line product supply means and accumulating an abutting contiguous line of said discrete products, said dynamic retarding means operating at a speed such that one discrete product or one discrete grouping of products will be delivered per predetermined spacing of said product receiving means;

discharge control means whose speed is greater than that of said dynamic retarding means and operable to open a space between succeeding products discharged from said dynamic retarding means and to transport products to said product receiving means;

said product receiving means arranged to receive product from said discharge control means;

means sensing the motion of said product receiving means;

means sensing the motion of said dynamic retarding means;

means sensing the position of predetermined spaces on said product receiving means;

means sensing the ends of succeeding products being released from said dynamic retarding means;

means computing the length of said spaces and the length of said products from information provided by said sensing means;

comparing means for comparing the length of said spaces and the length of said product with the motion of said product receiving means and the motion of said dynamic retarding means, said comparing means operable to automatically set the speed of said dynamic retarding means such that one said product or grouping of product will be discharged from said dynamic retarding means for the passage of each said space on said product receiving means; and means to compare the position of release of each said product with the position of each said space on said product receiving means and to adjust the speed of the dynamic retarding means if required to make a discrete correction to the position of said products in said dynamic retarding means such that each said product arrives at said product receiving means within said predetermined placement.

11. An in-line product feed system as in claim 10 and including means computing the length of said spaces and the length of said products from information provided by said sensing means; and comparing means for comparing the length of said spaces and the length of said product with the motion of said product receiving means and the motion of said dynamic retarding means, said comparing means operable to automatically set the speed of said dynamic retarding means such that one said product or grouping of product will be discharged from said dynamic retarding means for the passage of each said space on said product receiving means.

* * * * *